United States Patent [19]
Lahn

[11] 3,853,744
[45] Dec. 10, 1974

[54] SOUR WATER DISPOSAL IN FLUID SOLIDS SYSTEMS

[75] Inventor: Gerard C. Lahn, Parsippany, N.J.

[73] Assignee: Exxon Research and Engineering Company, Linden, N.J.

[22] Filed: May 14, 1973

[21] Appl. No.: 360,082

[52] U.S. Cl.............. 208/127, 203/10, 203/100, 208/164
[51] Int. Cl..... C10g 9/32, C01g 11/18, B01d 1/100
[58] Field of Search ............ 203/10, 100; 165/107; 208/127, 164

[56] References Cited
UNITED STATES PATENTS

| | | | |
|---|---|---|---|
| 2,758,073 | 8/1956 | Krebsi et al. | 203/10 |
| 2,773,003 | 12/1956 | Brown et al. | 208/370 |
| 3,442,769 | 5/1969 | Heinz | 203/10 |
| 3,459,638 | 8/1969 | Nagel | 203/10 |
| 3,702,516 | 11/1972 | Luckenbach | 308/127 |

Primary Examiner—Herbert Levine
Attorney, Agent, or Firm—M. L. Gibbons

[57] ABSTRACT

Sour water resolving from fluid solids hydrocarbon conversion processes, such as catalytic cracking and fluid coking, is disposed of by vaporization in a fluid solids bed. Heat for the vaporization is supplied by circulating hot solids between the steam generation vessel and the coker burner or heating unit in a fluid coking process or the regenerator in a catalytic cracking process. The process of this invention is particularly useful in the residuum conversion process which integrates coke gasification with fluid coking.

11 Claims, 1 Drawing Figure

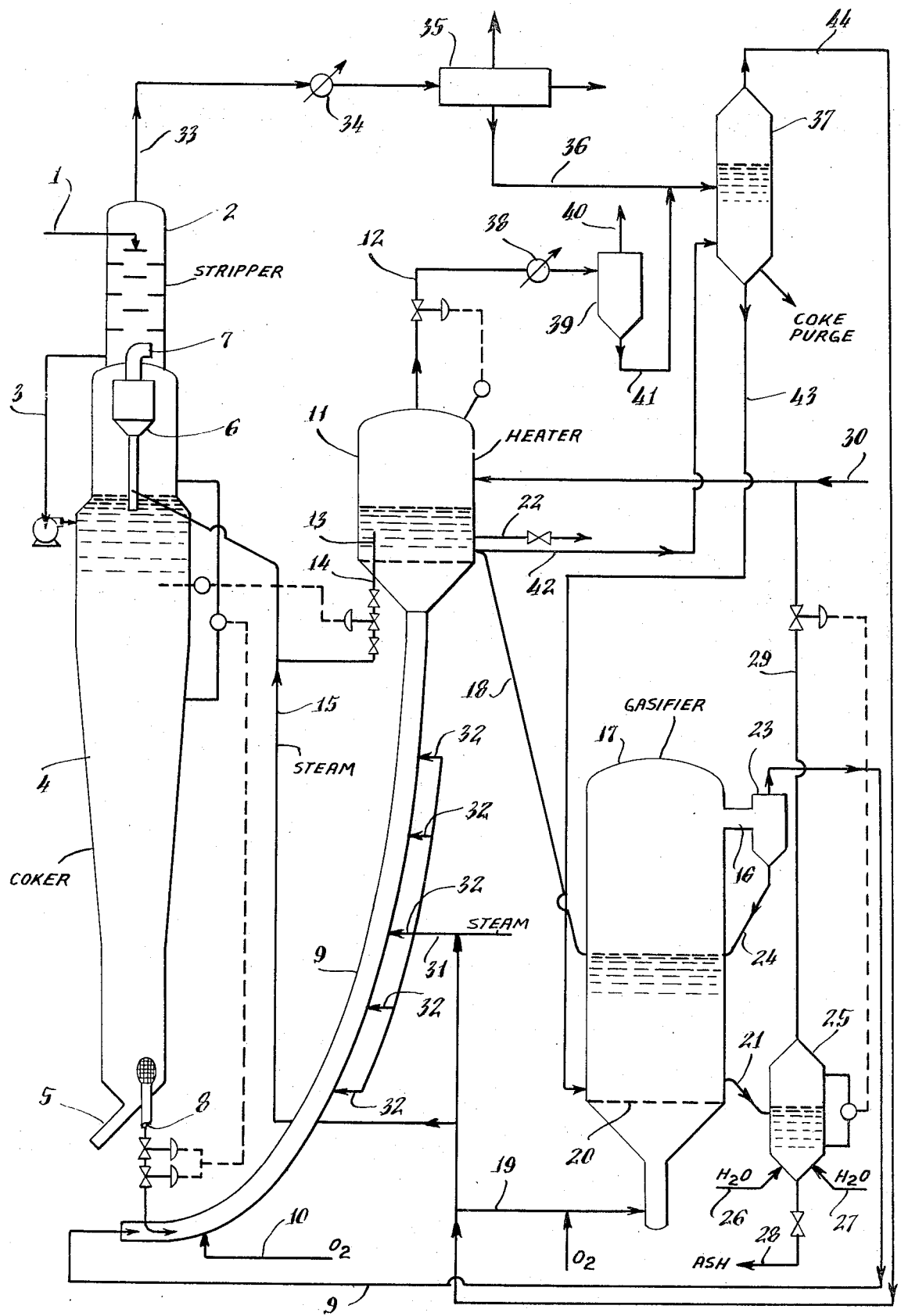

SOUR WATER DISPOSAL IN FLUID SOLIDS SYSTEMS

In petroleum refinery operations, such as catalytic cracking and fluid coking, large quantities of water are used for various purposes, particularly purifying fractions, steam distillation, dilution, heat transfer, fluid carrier, etc. The water becomes contaminated with various impurities found in crude petroleum and with other contaminants. This contaminated water, termed "sour water," typically contains substantial amounts of ammonia, sulfide, cyanide, chloride and other undesirable components. In former times, such sour water used in petroleum processing was disposed of by discharging it into a stream or some other available body of water. With the increase in the size and number of petroleum refineries and the number of processing steps in refining operations, the amount of contaminants in sour water reached such proportions as to pollute streams and lakes to the extent that fish, marine life and animals in the vicinity were adversely affected. Furthermore, in many areas, processing water is not available in sufficient quantities so that it may be used once and discarded. It is therefore advantageous, and in many instances absolutely essential, to reuse such processing water. In order to reuse this water and/or to discard it without substantial harm to the environment, it is necessary to treat the sour water in order to remove the undesirable contaminants.

Various methods have been suggested in the prior art to remove these contaminants in order to render the sour water fit for reuse in the refinery system, or for disposal. For example, U.S. Pat. Nos. 2,773,003, 2,927,075 and 2,930,753 teach methods of first stripping the volatile components of the sour water by use of a stripping gas such as steam and then heating the water by means of an external heat source and reusing the resulting steam. The prior art methods have a number of disadvantages, such as (1) the necessity for an external heat source, (2) the requirement for costly alloy materials in the steam generating vessel, (3) the necessity of a further step, such as a blow down, in order to remove solid particles.

It is therefore a principal object of this invention to provide a method for utilizing the sour water resulting from refinery operations in an economical manner and without encountering any of the foregoing disadvantages.

According to this invention, sour water is treated by converting it to steam in a fluid solid bed and using the resulting steam in the refinery process, for example, fluid coking or catalytic cracking. Heat for the steam generation is supplied by circulating hot solids between the steam generation vessel and the coker burner or heater or the regenerator of the catalytic cracking system. When employed in connection with catalytic cracking, the hot circulating solids are the catalytic particles themselves. In a fluid coking operation, the hot solids are usually coke particles. The steam so generated is a "sour steam" which contains the volatile contaminants from the sour water. The solid contaminants removed from the sour water remain with the coke or catalyst and can be purged from the system with product coke or returned to the burner, regenerator or gasifier where they can be incinerated.

The process of this invention is applicable to any fluid solids hydrocarbon conversion process, particularly to catalytic cracking and fluid coking. It is especially applicable to the residuum conversion process which integrates coke gasification and fluid coking. A typical sour water stream resulting from a fluid coking operation would contain the following volatile contaminants:

| Contaminant | Wt. - ppm |
|---|---|
| hydrogen sulfide | 3400 |
| ammonia | 850 |
| cyanides | 10 |
| chlorides | 200 |
| phenols | 75 |

Conventional fluid coking is described more fully in U.S. Pat. No. 2,881,130, which is incorporated herein by reference. The integration of coke gasification and fluid coking is more fully described in U.S. Pat. Nos. 3,661,543 and 3,702,516, both of which are hereby incorporated herein by reference.

The invention will be described below as being incorporated in the process taught by U.S. Pat. No. 3,702,516. It should be realized, however, that the invention may also advantageously be practiced in conventional coking and catalytic cracking systems.

The accompanying drawing, to which reference will now be made, illustrates schematically a process for converting a hydrocarbon residuum integrating coke gasification with fluid coking and showing one mode of applying the present invention.

A carbonaceous material having a Conradson carbon value of at least 15 percent, such as a heavy residuum having a boiling point above 1,050°F, or a coal tar slurry, or tarsands oil, is passed by line 1 into the top of scrubber 2 where it flows downwardly countercurrent to vaporous reaction products and collects in the bottom from where it is passed by line 3 to the upper portion of coking zone 4 onto a fluidized bed of solid particles maintained at a temperature of 950° to 1,050°F. The solid particles are preferably coke particles of from 40 to 1,000 microns in size, although, as pointed out more fully below, they may also be other fluidized inert particles. The contact of the heavy hydrocarbons in the feedstock and the hot solid particles results in the heavy hydrocarbons being converted to coke, light hydrocarbons and gases. The light hydrocarbons and gases are removed overhead through cyclone 6 and exit line 7 into scrubber 2 where they are scrubbed by incoming feed. The coke is removed in the dense phase at the bottom of the coker through line 8. The coke from line 8 is picked up by gasification gases produced in the process as described more fully below and flowing in line 9. These gases may be supplemented, if desired, by air or oxygen introduced through line 10. The resulting fluidized mass of particles is carried by line 9 to separator heater 11. In line 9, steam is introduced via line 31 and a plurality of nozzles 32 in order to expedite the flow of particles into heater 11.

The particles and gases in line 9 are introduced into separator heater 11 either through a rough cut cyclone (not shown) or into a bed of coke deposited on solids. Additional air or oxygen can be introduced into this bed by the distributor which fluidizes the bed. The gas from the fluidized particles so introduced is removed through cyclones (not shown) and exit line 12. Solid coke particles fall to the bottom of separator 11 and are withdrawn from the bed through well 13 into standpipe 14. Solids may be withdrawn from separator vessel 11 through line 22 in order to control particle size. The particles in standpipe 14 are lifted by steam introduced through line 15 and carried to the top of the fluid bed in coker 4. Solids are also fed from separator heater 11 to a fluidized bed in gasifier zone 17 via a conventional standpipe slide valve 18. The coke thus introduced is contacted with steam and air or oxygen introduced through line 19 and grid 20. The temperature of the bed is maintained at a level of about 1,400° to 2,800°F by preheating the inlet air, steam, oxygen stream and/or varying the steam and air ratio according to well known equilibrium relationships.

In the gasifier 17 the following reactions take place:

1. $(n+1)C + (0.5+n)O_2 \rightarrow CO + nCO_2$
2. $CO + \frac{1}{2} O_2 \rightarrow CO_2$
3. $CO_2 + C \leftrightarrows 2CO$
4. $H_2O + C \rightarrow H_2 + CO$
5. $H_2O + CO \rightarrow CO_2 + H_2$ When coke is oxidized, the initial product is a mixture of CO and $CO_2$ as shown in equation (1). At temperatures of 1,600°F and higher, in the presence of oxygen, CO is rapidly oxidized to $CO_2$ according to equation (2). After oxygen has been exhausted, $CO_2$ reacts with carbon to form CO. At high temperatures, equilibrium favors drawing equation (3) to the right to form CO. Low pressure also favors this reaction. Reaction (3) is slower than reaction (2). Thus, equilibrium would favor very high $CO/CO_2$ ratios at conditions of 1,600°-2,800°F and low pressures in the gasifier. Steam will also gasify coke as represented by equation (4). The reaction is slightly endothermic and when steam is substituted for some of the oxygen, the gasification zone temperature drops at a constant quantity of coke gasified. Finally, water reacts with CO to produce $CO_2$ and hydrogen in the water gas shift represented by equation (5). Most of the sulfur in the coke will be converted to $H_2S$ with a very small amount of COS being formed.

The gases formed by the above reactions pass upwardly through the gasifier and are removed by line 16 and passed to cyclone 23 where they are separated from entrained solids. The gases leave the cyclone 23 by line 9 and have the typical composition shown below when air is used for gasification:

|  | Mol % Including $H_2O + H_2$ | Mol % Excluding $H_2O + H_2S$ |
| --- | --- | --- |
| $H_2$ | 6.5 | 6.8 |
| $H_2O$ | 2.9 | — |
| CO | 19.9 | 20.6 |
| $CO_2$ | 7.9 | 8.2 |
| $N_2$ | 61.9 | 64.4 |
| $H_2S$ | 0.9 | — |
| Total | 100.0 | 100.0 |

Net heating value on a dry basis is 84.6 BTU/SCF. When oxygen is used for gasification, a typical composition of the gas is:

|  | Mol % Including $H_2O + H_2$ | Mol % Excluding $H_2O + H_2S$ |
| --- | --- | --- |
| $H_2$ | 24.2 | 30.9 |
| $H_2O$ | 20.0 | — |
| CO | 34.2 | 43.6 |
| $CO_2$ | 19.8 | 25.3 |
| $N_2$ | 0.1 | 0.2 |
| $H_2S$ | 1.7 | — |
| Total | 100.0 | 100.0 |

Net heating value on a dry basis is 224 BTU/SCF.

These gases are used to pick up solids coming from the reactor as described above. The quantity of gas is large and can easily carry twice the solids circulation that would be used in a conventional fluid coker. The superficial density is only 0.7 lbs./CF. This high rate reduces the temperature of solids gas mixture to about 1,050°F (if the gasifier is at 1,800°F).

Solid particles from cyclone 23 are passed via line 24 and returned to the dense bed in gasifier 17. Solid particles leave gasifier 17 by line 21 and are introduced into stripper 25 where they are stripped of occluded gases by steam introduced by lines 26 and 27. Ash is removed by line 28 and gases containing suspended ash are removed by line 29 and returned to separator heater 11 by line 30.

The foregoing describes a process for the integration of the use of solids as heat carrier and surface for coke laydown and the use of the product gases to circulate reactor effluent coke. In this process, however, considerable amounts of steam and water are used and this results in the accumulation of large amounts of sour steam and sour water, i.e., steam and water contaminated with ammonia, sulfide, cyanide, chloride and other undesirable materials.

According to the process of this invention, the overhead of scrubber 2 is removed via line 33, cooled in condenser 34 and passed to separating drum 35 in which the overhead is separated into gas, naphtha and sour water. Line 36 removes sour water from drum 35 and passes it to a fluid bed sour steam generator 37. The gaseous overhead of heater 11, including unreacted steam, is removed via line 12, cooled in condenser 38 and passed to a venturi-type water scrubber 39 to remove entrained coke fines. Therein, a portion of the unreacted steam condenses. Scrubbed gases are removed via line 40 and sour water is removed via line 41 and passed to fluid bed sour steam generator 37. Hot fluid coke from the dense bed of separator heater 11 is circulated via line 42 into the fluid bed sour steam generator 37 and then via line 43 into gasifier 17. Steam generated in generator 37 is removed via line 44 which is connected to lines 15, 19 and 31 through which the steam enters the coker, gasifier and separator heater, respectfively.

The foregoing illustration shows the use of this invention in a particular process which integrates fluid coking and coke gasification using separate heater and gasification vessels. By suitable modification obvious to any person skilled in the art, this invention is also applicable to a process which integrates coke gasification and fluid coking, in which the heater and gasifier constitute a single unit separated by a gas distributor. This process is more fully disclosed in U.S. Pat. No. 3,661,543.

It should also be understood that this invention is equally applicable to conventional fluid coking systems, such as that disclosed in U.S. Pat. No. 2,881,130. In this application, sour water is fed to a coke quench vessel and the overhead therefrom is fed to the stripper. Heat for vaporization is supplied by circulating hot coke between the burner and quench vessel.

As noted above, this invention is also applicable to the treatment of sour water in catalytic cracking systems. The sour water can be vaporized in a catalyst quench vessel, heat for the vaporization being supplied by circulating hot catalyst between the regenerator and the quench vessel. The sour steam obtained may then be utilized as stripping steam in the catalyst stripper.

In addition to the utilization of sour water in coking and catalytic processes, this invention is applicable to waste water streams resulting also from other petroleum conversion processes such as hydrotreating and gas scrubbing. In the gas scrubbing procedure known as the Stretford process, for example, the resulting sour water contains large amounts of sodium sulfide, sodium thiosulfate, sodium metavanadate and anthraquinone disulfonic acid. The volatile contaminants are returned to the process (in the steam) where they build up to equilibrium level and eventually leave the system with other gaseous products. The solid contaminants are purged with the coke.

The preferred embodiment of this invention is its use in fluid coking operations, substantially as described in detail above. The process there described used circulating coke as the fluidized medium. However, it is to be understood that a captive bed of fluidized inert particles other than coke, such as silica, alumina, zirconia, magnesia, alundum or mullite, or combinations thereof, may be used. There may also be particles built up of vanadium, nickel or other contaminants in the feedstock. The materials may be synthetically prepared or may be naturally occurring materials such as pumice, clay kieselguhr, diatomaceous earth, or bauxite. Further details concerning such captive bed particles may be found in U.S. Pat. No. 3,702,516, hereinbefore incorporated by reference.

What is claimed is:

1. In a hydrocarbon conversion process wherein a stream of fluidized solid particles is circulated between a conversion zone and a heating zone, the improvement which comprises:
   a. passing a stream of hot fluidized particles from said heating zone to a steam generation zone;
   b. introducing a refinery waste water stream into said steam generation zone and contacting the same with said hot fluidized particles thereby vaporizing said refinery waste water stream to steam, and
   c. utilizing at least a portion of the resulting steam, without further treatment, in said hydrocarbon conversion process.

2. The process of claim 1, wherein said waste water stream comprises non-volatile contaminants and wherein the non-volatile contaminants are deposited on said fluidized solid particles in said steam generation zone by said vaporization.

3. The process of claim 1, wherein said refinery waste water is sour water derived from a hydrocarbon conversion process which utilizes solid particles maintained in a fluidized state by a fluidizing gas comprising steam, said sour water comprising volatile contaminants, and wherein said sour water is converted to sour steam comprising said volatile contaminants and wherein at least a portion of said sour steam, including the volatile contaminants, is utilized in said hydrocarbon conversion process.

4. The process of claim 2, wherein said fluidized particles are catalytic particles.

5. The process of claim 2, wherein said fluidized particles are inert particles.

6. The process of claim 2, wherein said hydrocarbon conversion process is a catalytic cracking process and wherein said fluidized particles comprise catalyst particles and said heating zone is a catalyst regeneration zone.

7. The process of claim 2, wherein said hydrocarbon conversion process is a coking process.

8. The process of claim 7, wherein said fluidized solid particles comprise coke particles formed by said coking process.

9. In a coking process comprising a coking zone containing a fluidized bed of solid particles and a heating zone, and wherein a stream of fluidized particles is circulated between said coking zone and said heating zone, said particles being fluidized by a fluidizing gas comprising steam, the improvement which comprises: (a) passing a stream of hot fluidized particles from said heating zone to a steam generation zone; (b) introducing into said steam generation zone sour water comprising volatile contaminants and contacting said sour water with said hot fluidized particles to convert said sour water to sour steam, and (c) utilizing at least a portion of said sour steam as fluidizing gas in said coking process.

10. The process of claim 9, wherein said sour water is derived from said coking process.

11. The process of claim 9, wherein said coking process additionally comprises a coke gasification zone.

* * * * *